(12) United States Patent
Shin et al.

(10) Patent No.: US 12,073,843 B2
(45) Date of Patent: Aug. 27, 2024

(54) METHOD AND APPARATUS FOR TARGET EXAGGERATION FOR DEEP LEARNING-BASED SPEECH ENHANCEMENT

(71) Applicant: Gwangju Institute of Science and Technology, Gwangju (KR)

(72) Inventors: Jong Won Shin, Gwangju (KR); Han Sol Kim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 444 days.

(21) Appl. No.: 17/510,430

(22) Filed: Oct. 26, 2021

(65) Prior Publication Data

US 2023/0037939 A1   Feb. 9, 2023

(30) Foreign Application Priority Data

Aug. 4, 2021   (KR) .................... 10-2021-0102603

(51) Int. Cl.
| | | |
|---|---|---|
| G10L 21/02 | (2013.01) |
| G10L 15/02 | (2006.01) |
| G10L 15/16 | (2006.01) |
| G10L 25/84 | (2013.01) |

(52) U.S. Cl.
CPC .............. G10L 21/02 (2013.01); G10L 15/02 (2013.01); G10L 15/16 (2013.01); G10L 25/84 (2013.01)

(58) Field of Classification Search
CPC ..... G10L 25/30; G10L 15/16; G10L 21/0208; G10L 21/0232; G10L 15/02; G10L 21/02; G10L 15/20; G10L 21/0216; G10L 21/0264; G10L 15/063; G10L 21/0272; G10L 21/0356; G10L 25/84; G10L 15/26; G10L 17/04; G10L 17/18; G10L 21/028; G10L 21/0364; G10L 25/18; G10L 25/93
See application file for complete search history.

(56) References Cited

U.S. PATENT DOCUMENTS

| | | | | |
|---|---|---|---|---|
| 11,508,388 B1 * | 11/2022 | Souden | ............... | G10L 21/0208 |
| 11,646,009 B1 * | 5/2023 | Chhetri | ................... | G10L 15/16 |
| | | | | 704/232 |
| 11,727,926 B1 * | 8/2023 | Liu | ..................... | G10L 21/0208 |
| | | | | 704/232 |
| 11,756,570 B2 * | 9/2023 | Tzinis | ................... | G06F 18/214 |
| | | | | 381/56 |

(Continued)

OTHER PUBLICATIONS

Xu et al. "A Regression Approach to Speech Enhancement Based on Deep Neural Networks" (IEEE/ACM Transactions on Audio, Speech, and Language Processing, vol. 23, No. 1, Jan. 2015). (Year: 2015).*

(Continued)

*Primary Examiner* — Abdelali Serrou
(74) *Attorney, Agent, or Firm* — Revolution IP, PLLC

(57) ABSTRACT

The present disclosure relates to a speech enhancement apparatus, and specifically, to a method and apparatus for a target exaggeration for deep learning-based speech enhancement. According to an embodiment of the present disclosure, the apparatus for a target exaggeration for deep learning-based speech enhancement can preserve a speech signal from a noisy speech signal and can perform speech enhancement for removing a noise signal.

14 Claims, 7 Drawing Sheets

(56) References Cited

U.S. PATENT DOCUMENTS

| | | | | |
|---|---|---|---|---|
| 11,783,849 B2 * | 10/2023 | Variani | ................... | G10L 15/16 |
| | | | | 704/202 |
| 11,854,564 B1 * | 12/2023 | Chatlani | ................. | G10L 15/16 |
| 11,961,522 B2 * | 4/2024 | Kim | ........................ | G10L 25/21 |
| 11,978,464 B2 * | 5/2024 | Kleijn | ..................... | G10L 19/04 |
| 2017/0092268 A1 * | 3/2017 | Kristjansson | ........... | G10L 15/16 |

OTHER PUBLICATIONS

Yong Xu et al, "Global variance equalization for improving deep neural network based speech enhancement", 2014 IEEE China Summit & International Conference on Signal and Information Processing (ChinaSIP), IEEE, 2014, pp. 71-75.

P. G. Shivakumar et al, "Perception optimized deep denoising autoencoders for speech enhancement", INTERSPEECH 2016, 17th Annual Conference of the International Speech Communication Association, ISCA, 2016, pp. 3743-3747.

* cited by examiner

【FIG. 1】
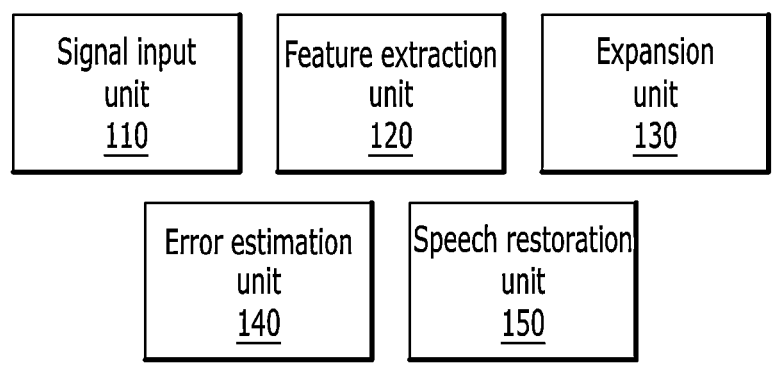

[FIG. 2]
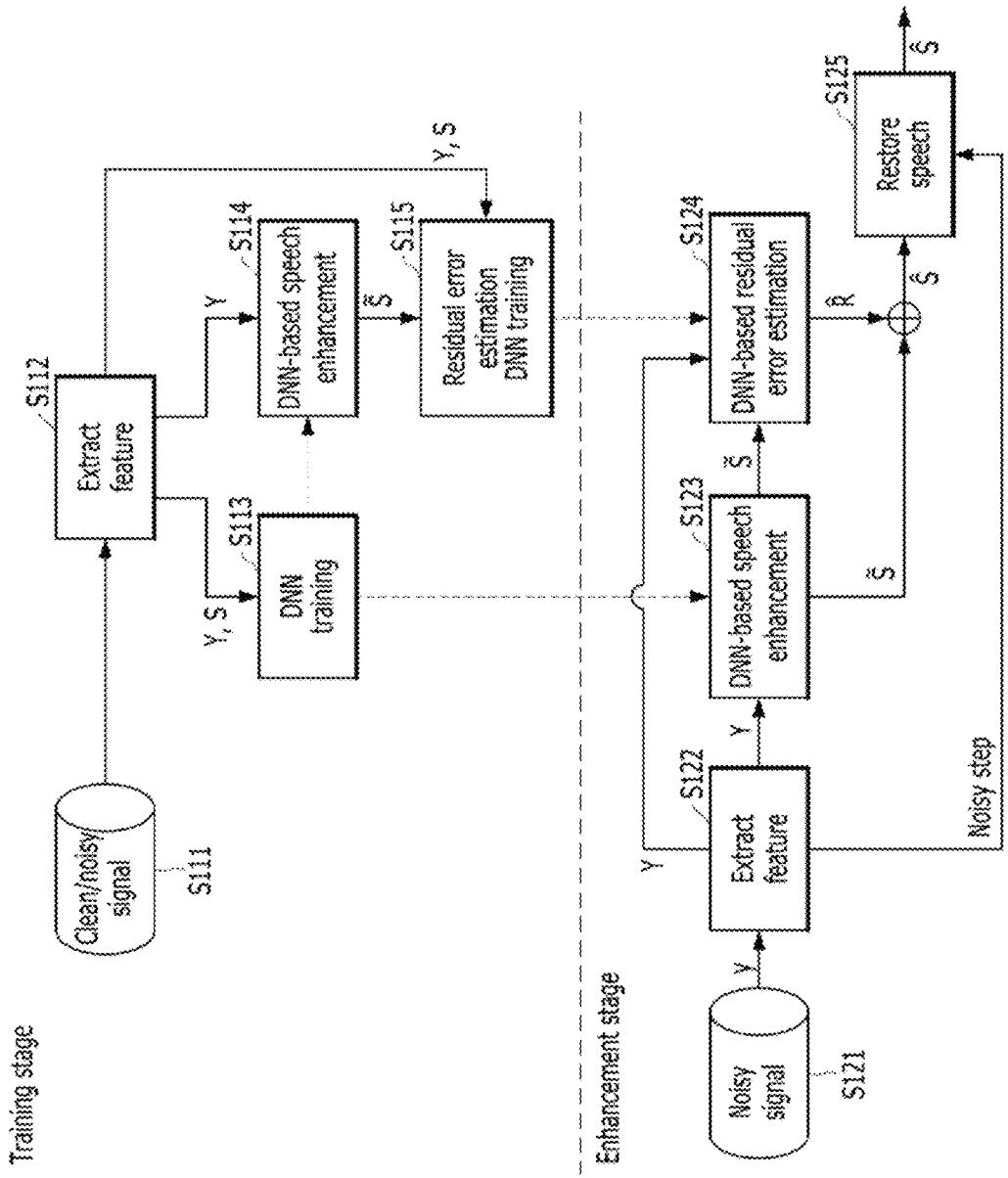

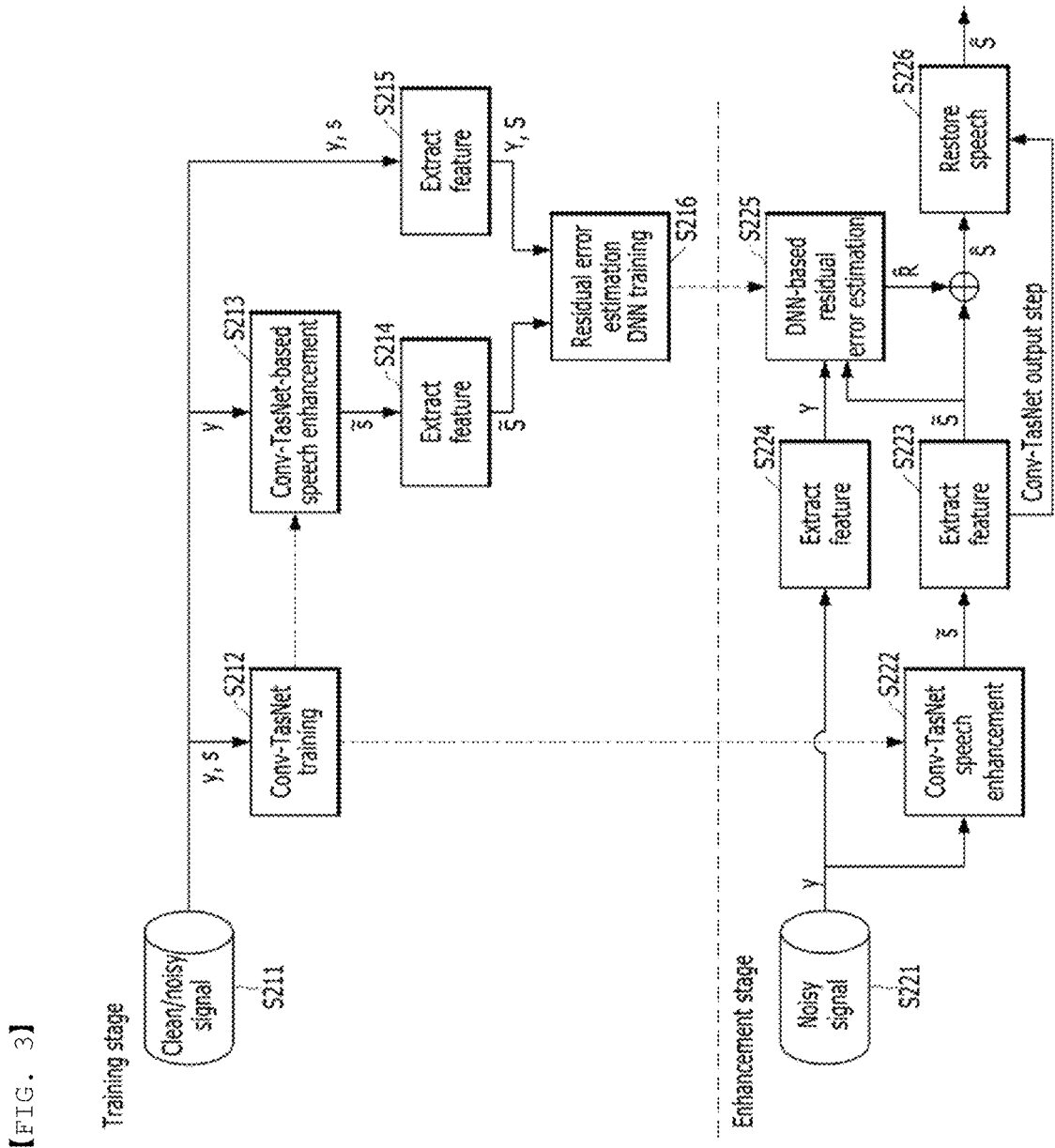
[FIG. 3]

[FIG. 4]

Target exaggeration in the cost function

| SNR (dB) | Noisy | fIDNN (D=0) | D=0 | D=1 | D=2 | D=3 | D=4 | D=5 | D=6 |
|---|---|---|---|---|---|---|---|---|---|
| -5 | 1.56 | 1.73 | | 1.70 | 1.70 | 1.73 | 1.70 | 1.73 | 1.70 |
| 0 | 1.89 | 2.19 | | 2.20 | 2.22 | 2.26 | 2.24 | 2.21 | 2.18 |
| 5 | 2.22 | 2.62 | | 2.68 | 2.69 | 2.71 | 2.68 | 2.65 | 2.61 |
| 10 | 2.55 | 2.88 | | 2.85 | 2.86 | 3.10 | 3.05 | 3.01 | 2.93 |
| 15 | 2.88 | 3.29 | | 3.36 | 3.40 | 3.41 | 3.33 | 3.25 | 3.12 |
| 20 | 3.20 | 3.55 | | 3.62 | 3.65 | 3.62 | 3.40 | 3.36 | 3.20 |
| Avg | 2.38 | 2.73 | | 2.77 | 2.79 | 2.80 | 2.76 | 2.71 | 2.63 |

[FIG. 5]

Target exaggeration with an additional DNN

| SNR (dB) | Noisy | fIDNN | D=0 | D=1 | D=2 | D=3 | D=4 | D=5 | D=6 |
|---|---|---|---|---|---|---|---|---|---|
| -5 | 1.56 | 1.73 | 1.82 | 1.86 | 1.90 | 1.90 | 1.90 | 1.87 | 1.84 |
| 0 | 1.89 | 2.19 | 2.27 | 2.32 | 2.37 | 2.37 | 2.37 | 2.35 | 2.31 |
| 5 | 2.22 | 2.62 | 2.68 | 2.75 | 2.79 | 2.81 | 2.80 | 2.79 | 2.75 |
| 10 | 2.55 | 2.88 | 2.93 | 3.12 | 3.17 | 3.18 | 3.18 | 3.16 | 3.10 |
| 15 | 2.88 | 3.29 | 3.36 | 3.45 | 3.50 | 3.51 | 3.49 | 3.44 | 3.32 |
| 20 | 3.20 | 3.55 | 3.62 | 3.73 | 3.77 | 3.75 | 3.68 | 3.57 | 3.41 |
| Avg | 2.38 | 2.73 | 2.79 | 2.87 | 2.92 | 2.92 | 2.90 | 2.86 | 2.79 |

[FIG. 6]

| SNR (dB) | Noisy | | fDNN | | Target exaggeration in cost function | | Target exaggeration with additional DNN | |
|---|---|---|---|---|---|---|---|---|
| | PESQ | STOI | PESQ | STOI | PESQ | STOI | PESQ | STOI |
| -5 | 1.47 | 0.60 | 1.73 | 0.60 | 1.76 | 0.59 | 1.89 | 0.62 |
| 0 | 1.75 | 0.75 | 2.14 | 0.75 | 2.22 | 0.74 | 2.32 | 0.77 |
| 5 | 2.07 | 0.85 | 2.55 | 0.85 | 2.66 | 0.84 | 2.74 | 0.87 |
| 10 | 2.40 | 0.91 | 2.90 | 0.91 | 3.04 | 0.89 | 3.11 | 0.92 |
| 15 | 2.73 | 0.94 | 3.21 | 0.94 | 3.37 | 0.92 | 3.44 | 0.95 |
| 20 | 3.06 | 0.95 | 3.49 | 0.95 | 3.60 | 0.93 | 3.70 | 0.96 |
| Avg. | 2.24 | 0.83 | 2.67 | 0.83 | 2.78 | 0.82 | 2.86 | 0.85 |

[FIG. 7]

| SNR (dB) | fDNN | | GVE post-processing | | GVE post-training | | POS-DAE | | Target exaggeration | |
|---|---|---|---|---|---|---|---|---|---|---|
| | PESQ | STOI | PESQ | STOI | PESQ | STOI | PESQ | STOI | PESQ | STOI |
| -5 | 1.73 | 0.60 | 1.75 | 0.60 | 1.71 | 0.59 | 1.72 | 0.61 | 1.89 | 0.62 |
| 0 | 2.14 | 0.75 | 2.18 | 0.75 | 2.16 | 0.74 | 2.13 | 0.75 | 2.32 | 0.77 |
| 5 | 2.55 | 0.85 | 2.61 | 0.85 | 2.61 | 0.85 | 2.55 | 0.86 | 2.74 | 0.87 |
| 10 | 2.90 | 0.91 | 2.98 | 0.90 | 2.99 | 0.91 | 2.93 | 0.92 | 3.11 | 0.92 |
| 15 | 3.21 | 0.94 | 3.31 | 0.93 | 3.33 | 0.94 | 3.27 | 0.95 | 3.44 | 0.95 |
| 20 | 3.49 | 0.95 | 3.58 | 0.95 | 3.61 | 0.95 | 3.57 | 0.96 | 3.70 | 0.96 |
| Avg. | 2.67 | 0.83 | 2.74 | 0.83 | 2.74 | 0.83 | 2.70 | 0.84 | 2.86 | 0.85 |

[FIG. 8]

| Model | PESQ | STOI |
|---|---|---|
| ffDNN | 2.67 | 0.83 |
| ffDNN with target exaggeration | 2.86 | 0.85 |
| LSTM | 2.75 | 0.85 |
| LSTM with target exaggeration | 2.90 | 0.85 |
| Conv-TasNet | 3.00 | 0.92 |
| Conv-TasNet with target exaggeration | 3.15 | 0.92 |

METHOD AND APPARATUS FOR TARGET EXAGGERATION FOR DEEP LEARNING-BASED SPEECH ENHANCEMENT

CROSS REFERENCE TO RELATED APPLICATION

This application is based on and claims priority under 35 U.S.C. 119 to Korean Patent Application No. 10-2021-0102603, filed on Aug. 4, 2021, in the Korean Intellectual Property Office, the disclosures of which is herein incorporated by reference in their entireties.

BACKGROUND OF THE INVENTION

1. Technical Field

The present disclosure relates to a speech enhancement apparatus, and more particularly, to a method and apparatus for a target exaggeration for deep learning-based speech enhancement.

2. Description of the Related Art

An artificial intelligence (AI) technology includes machine learning (deep learning) and element descriptions using machine learning. Machine learning is an algorithm technology for autonomously classifying/learning features of input data. The element description is a technology using a machine learning algorithm, such as deep learning, and is composed of technical fields, such as linguistic understanding, visual understanding, inference/prediction, a knowledge expression, and operation control.

Various fields to which the AI technology is applied are as follows. Linguistic understanding is a technology for recognizing and applying/processing a language/text of a human being, and includes natural language processing, machine translation, a dialogue system, questions and answers, speech recognition/synthesis, etc. Visual understanding is a technology for recognizing and processing a thing like a vision of a human being, and includes object recognition, object tracking, image search, person recognition, scene understanding, space understanding, image improvement, etc. Inference prediction is a technology for logically inferring and predicting information by determining the information, and includes knowledge/probability-based inference, optimization prediction, preference-based plan, recommendation, etc. A knowledge expression is a technology for automating experience information of a human being as knowledge data, and includes a knowledge construction (data generation/classification), knowledge management (data utilization), etc.

There is a need for a technology for preserving a speech signal from a speech signal contaminated by noise and removing a noise signal by using the AI technology. Specifically, speech enhancement requires a deep learning technology for enhancing performance of speech enhancement by automatically modeling a complicated relation between a noisy signal and a speech signal through learning based on data. In particular, there is a need for a technology capable of solving an over-smoothing phenomenon which causes speech distortion and degraded intelligibility by reducing a dynamic range of a speech produced by deep learning-based speech enhancement.

PRIOR ART DOCUMENT

Non-Patent Document (Non-Patent Document 0001) Y. Xu, J. Du, L.-R. Dai, C.-H. Lee, Global variance equalization for improving deep neural network based speech enhancement, in: 2014 IEEE China Summit & International Conference on Signal and Information Processing (ChinaSIP), IEEE, 2014, pp. 71-75.

(Non-Patent Document 0002) P. G. Shivakumar, P. G. Georgiou, Perception optimized deep denoising autoencoders for speech enhancement, in: INTERSPEECH 2016, 17th Annual Conference of the International Speech Communication Association, ISCA, 2016, pp. 3743-3747.

SUMMARY OF THE INVENTION

Embodiments of the present disclosure provide a method of performing at least one target process among a target exaggeration for DNN-based speech enhancement in a time-frequency domain approach method and a target exaggeration for DNN-based speech enhancement in a time domain approach method.

Technical objects to be achieved in the present disclosure are not limited to the aforementioned technical object, and other technical objects not described above may be evidently understood by a person having ordinary knowledge in the art to which the present disclosure pertains from the following description.

According to an aspect of the present disclosure, there is provided an apparatus for a target exaggeration for deep learning-based speech enhancement.

The apparatus for a target exaggeration for deep learning-based speech enhancement according to an embodiment of the present disclosure may include a signal input unit configured to receive a speech signal comprising a clean signal and a noisy signal, a feature extraction unit configured to extract a feature of the speech signal, an expansion unit configured to perform the deep learning-based speech enhancement and target exaggeration based on the extracted feature of the speech signal, an error estimation unit configured to estimate a target-exaggerated residual error of the speech signal obtained by the deep learning-based speech enhancement, and a speech restoration unit configured to restore a speech based on the enhanced speech signal and the estimated target-exaggerated residual error.

According to an aspect of the present disclosure, there is provided a method for a target exaggeration for deep learning-based speech enhancement and a computer program for executing the method.

The method for a target exaggeration for deep learning-based speech enhancement according to an embodiment of the present disclosure may include steps of receiving a speech signal comprising a clean signal and a noisy signal, extracting a feature of the speech signal, performing the deep learning-based speech enhancement and target exaggeration based on the extracted feature of the speech signal, estimating a target-exaggerated residual error of the speech signal obtained by the deep learning-based speech enhancement, and restoring a speech based on the enhanced speech signal and the estimated target-exaggerated residual error.

According to an embodiment of the present disclosure, speech quality can be enhanced by preserving a speech signal from a noisy speech signal and removing a noise signal.

According to an embodiment of the present disclosure, the technology for enhancing speech quality of a received speech signal can be applied to various audio processing devices.

According to an embodiment of the present disclosure, the present disclosure may be used in speech recognition and recording devices, security equipment, etc.

Effects of the present disclosure are not limited to the above effects, and should be understood as including all effects which may be inferred from the construction of the present disclosure described in the description or claims of the present disclosure.

BRIEF DESCRIPTION OF THE DRAWINGS

FIG. 1 is a diagram illustrating an apparatus for a target exaggeration for deep learning-based speech enhancement according to an embodiment of the present disclosure.

FIGS. 2 and 3 are diagrams for describing a target exaggeration method in a cost function of deep learning-based speech enhancement and a target exaggeration method with an additional DNN according to an embodiment of the present disclosure.

FIGS. 4 to 8 are diagrams for describing speech enhancement according to an embodiment of the present disclosure and an embodiment of the target exaggeration method.

DETAILED DESCRIPTION

Figure 9:
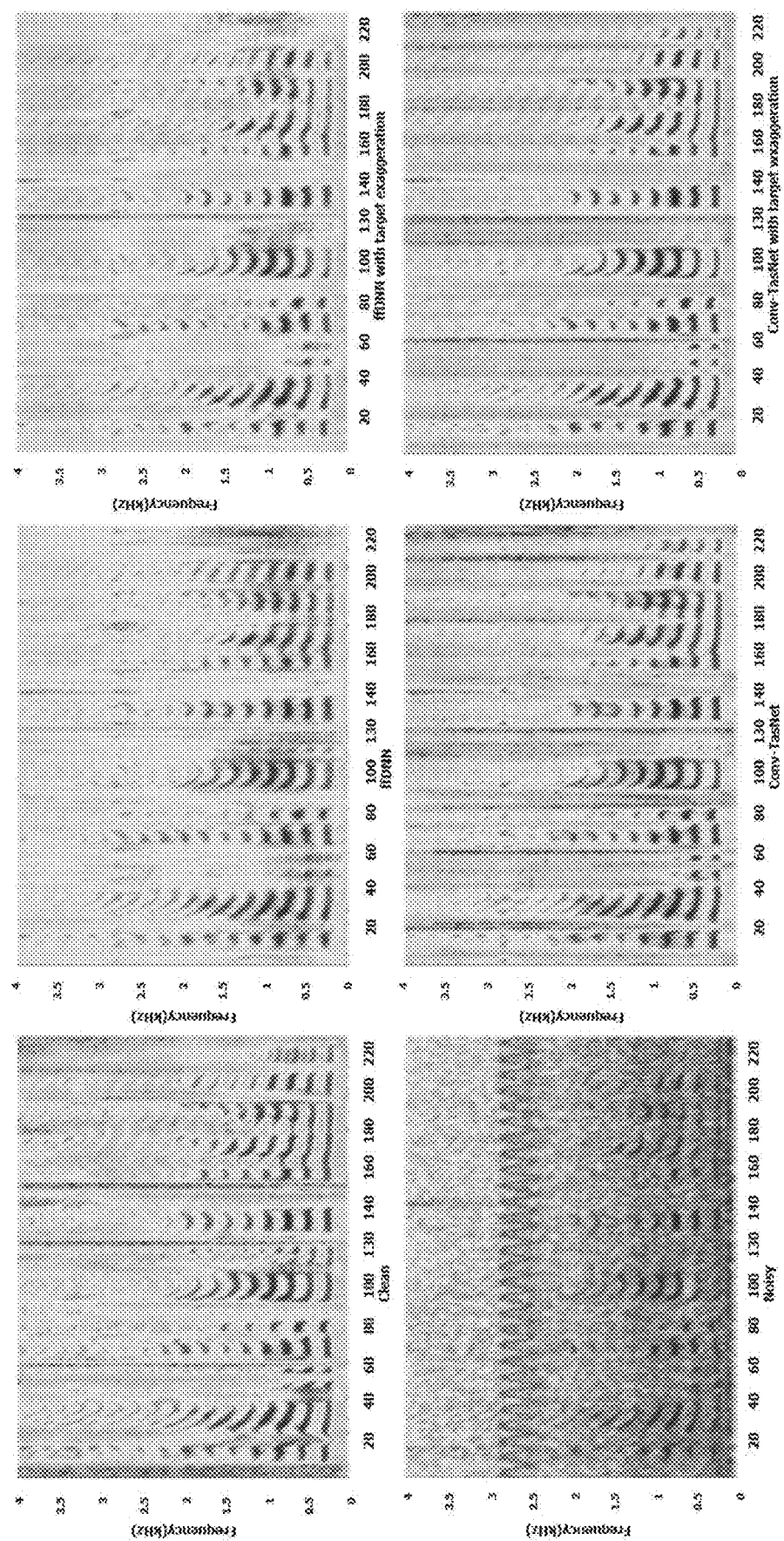
FIG. 9 is a diagram illustrating performance of the target exaggeration method applied to deep learning-based speech enhancement schemes according to an embodiment of the present disclosure.

Hereinafter, embodiments of the present disclosure are described in detail with reference to the accompanying drawings. The present disclosure may be modified in various different ways, and is not limited to the disclosed embodiments herein. In order to clarify a description of the present disclosure, a description of a part not related to the description is omitted, and the same reference numbers are used throughout the specification to refer to the same or similar part.

In the entire specification, when it is described that one part is "connected to (or coupled to or brought into contact with or combined with)" the other part, the one part may be "directly and electrically coupled" to the other part or may be "indirectly and electrically coupled" to the other part through a third part. Furthermore, when it is said that one part "includes" the other part, the word "include" will be understood to imply the inclusion of stated parts but not the exclusion of any other parts, unless explicitly described to the contrary.

The terms used in this specification are used to only describe specific embodiments and are not intended to restrict the present disclosure. An expression of the singular number should be construed as including an expression of the plural number unless clearly defined otherwise in the context. It is to be understood that in this specification, a term, such as "include (or comprise)" or "have", is intended to designate the presence of a characteristic, a number, a step, an operation, an element, a part or a combination of them described in the specification and does not exclude the existence or possible addition of one or more other characteristics, numbers, steps, operations, elements, parts or combinations of them in advance.

Hereinafter, embodiments of the present disclosure are described in detail with reference to the accompanying drawings.

FIG. 1 is a diagram illustrating an apparatus for a target exaggeration for deep learning-based speech enhancement according to an embodiment of the present disclosure.

Referring to FIG. 1, a speech enhancement apparatus is an apparatus for preserving a speech signal from a speech signal contaminated by noise (i.e., a noisy signal) and removing a noise signal. The speech enhancement apparatus may perform speech enhancement by modeling a complicated relation between a noisy signal and a speech signal. The speech enhancement apparatus may automatically model the relation between the noisy signal and the speech signal through learning based on data by using a deep learning technology.

A time-frequency domain approach method and a time domain approach method may be used in the modeling of deep learning-based speech enhancement used in the speech enhancement apparatus.

The speech enhancement apparatus may include a signal input unit 110, a feature extraction unit 120, an expansion unit 130, an error estimation unit 140, and a speech restoration unit 150.

The signal input unit 110 may receive a speech signal. The speech signal may include a clean signal and a noisy signal.

The feature extraction unit 120 may extract a feature of a speech signal. The feature extraction unit 120 may extract a clean feature and a noisy feature from a received clean signal and noisy signal.

According to an embodiment, the feature extraction unit 120 may receive a clean signal and a noisy signal, and extract a speech feature of the clean signal and the noisy signal.

According to an embodiment, the feature extraction unit 120 may extract a feature of a signal obtained by DNN- and Conv-TasNet-based speech enhancement.

The expansion unit 130 may expand by enhancing a speech signal through a deep learning model.

The expansion unit 130 may perform deep learning-based speech enhancement and a target exaggeration based on an extracted feature of a speech signal.

According to an embodiment, the expansion unit 130 may perform a target exaggeration for DNN-based speech enhancement in the time-frequency domain approach method as a target exaggeration for deep learning-based speech enhancement. The expansion unit 130 may perform a target exaggeration for DNN-based speech enhancement in the time domain approach method as a target exaggeration for deep learning-based speech enhancement.

The expansion unit 130 may use a cost function (mean-square error (MSE)) in order to train a deep learning model used in the time-frequency domain approach method.

The target exaggeration method performed by the expansion unit 130 may be a method of exaggerating a training target in order to make an output (e.g., an over-smoothed speech LPS feature) of the deep learning model having an over-smoothing phenomenon close to a clean speech LPS feature.

The expansion unit 130 may use a cost function of deep learning-based speech enhancement in order to mitigate a reduction in the dynamic range of a speech attributable to over-smoothing, as a cost function used in a target exaggeration method according to a target exaggeration in a cost function of DNN-based speech enhancement. The cost function of deep learning-based speech enhancement may be used as in Equation 1.

$$C = \frac{1}{N} \sum_{n=1}^{N} \sum_{k=1}^{K} (\hat{S}(n,k) - (S(n,k) + E(n,k)))^2 \quad \text{[Equation 1]}$$

in which $$E(n,k) = \frac{S(n,k) - S_{min}(k)}{S_{max}(k) - S_{min}(k)} D$$

wherein E(n,k) is an exaggeration factor proportional to a clean speech LPS function. $S_{max}(k)$ and $S_{min}(k)$ are a maximum value and a minimum value of a clean speech feature in all training sets for a k-th frequency. D is a parameter that controls a degree of an exaggeration. In this case, since E(n,k) is proportional to a clean speech feature (log-power spectra (LPS)), the degree of an exaggeration may be adjusted based on the magnitude of a speech.

The expansion unit 130 may perform downscaling because a speech obtained by a target exaggeration in the cost function of DNN-based speech enhancement has greater power than that in the clean speech signal.

In this case, the scaling factor of downscaling may be calculated as in Equation 2 below in order to compensate for an average power mismatch for all the training sets.

$$\eta = \sqrt{\frac{\frac{1}{ML} \sum_{m=1}^{M} \sum_{l=1}^{L} |s^m(l)|^2}{\frac{1}{ML} \sum_{m=1}^{M} \sum_{l=1}^{L} |\hat{s}^m(l)|^2}} \quad \text{[Equation 2]}$$

wherein $s^m(l)$ and $\hat{s}^m(l)$ are 1-th samples of a frame m for the clean speech signal and the speech signal obtained by the target exaggeration. L is the size of the frame.

Accordingly, in an enhancement stage, downscaling of a speech obtained by a target exaggeration in the cost function of DNN-based speech enhancement may be performed as in Equation 3 below.

$$\hat{s}^m = \hat{s}^m \times \eta \quad \text{[Equation 3]}$$

wherein $\hat{s}^m$ may be an enhanced waveform in the time domain for an n-th frame.

Finally, an overlap-add method for $\hat{s}^m$ may be applied to enhanced waveforms for all frames to construct the enhanced utterance.

The expansion unit 130 may perform a target exaggeration method with an additional DNN that estimates a residual error of the speech signal obtained by deep learning-based speech enhancement as Equations 4 and 5.

$$R(n,k) = S(n,k) - \tilde{S}(n,k) \quad \text{[Equation 4]}$$

wherein R(n,k) may be a residual error of a DNN-based speech enhancement output $\tilde{S}(n,k)$.

In this case, the cost function used to train the additional deep learning model is as follows.

$$C = \frac{1}{N} \sum_{n=1}^{N} \sum_{k=1}^{K} (\hat{R}(n,k) - (S(n,k) - \tilde{S}(n,k) + E(n,k)))^2 \quad \text{[Equation 5]}$$

wherein $\hat{R}(n,k)$ may be the output of the additional DNN.

Furthermore, in the downscaling in the target exaggeration with an additional DNN, a downscaling factor may be calculated using $\tilde{S}$ and $\hat{S}$ for a test set. Such a target exaggeration with an additional DNN may be applied to any deep learning-based speech enhancement systems.

The expansion unit 130 may perform a target exaggeration in the cost function of DNN-based speech enhancement and a target exaggeration with an additional DNN in the time-frequency domain.

If training stage for speech enhancement to which a target exaggeration in a cost function in the time-frequency domain approach method has been applied is performed, the expansion unit 130 may perform DNN training by using a target-exaggerated cost function based on an extracted speech feature.

If enhancement stage for speech enhancement to which a target exaggeration in a cost function in the time-frequency domain approach method has been applied is performed, the expansion unit 130 may perform target-exaggerated DNN-based speech enhancement based on a feature extracted in a noisy signal and a trained DNN.

If training stage for speech enhancement to which a target exaggeration with an additional DNN in the time-frequency domain approach method has been applied is performed, the expansion unit 130 may train a DNN with a MSE cost function using an extracted speech feature. Thereafter, the expansion unit 130 may perform DNN-based speech enhancement based on a trained DNN. Furthermore, the expansion unit 130 may perform DNN training for target-exaggerated residual error estimation based on speech features extracted in a clean signal, a noisy signal, and a signal obtained by a DNN-based speech enhancement.

If enhancement stage for speech enhancement to which a target exaggeration with an additional DNN in the time-frequency domain approach method has been applied is performed, the expansion unit 130 may perform target-exaggerated DNN-based speech enhancement based on a speech feature extracted in a noisy signal and a signal obtained by a DNN-based speech enhancement and a trained additional DNN.

The expansion unit 130 may perform a target exaggeration with an additional DNN in the time domain approach method.

If training stage for speech enhancement to which a target exaggeration with an additional DNN in the time domain approach method has been applied is performed, the expansion unit 130 may perform Conv-TasNet training on a clean signal and a noisy signal by using a cost function (scale-invariant source-to-noise ratio (SI-SNR)). Thereafter, the expansion unit 130 may perform Conv-TasNet-based speech enhancement on the noisy signal based on a trained Conv-TasNet. Furthermore, the expansion unit 130 may perform DNN training for target-exaggerated residual error estimation based on a speech feature extracted in a clean signal, a noisy signal and a signal obtained by a Conv-TasNet-based speech enhancement.

If enhancement stage for speech enhancement to which a target exaggeration with an additional DNN in the time domain approach method has been applied is performed, the expansion unit 130 may perform target-exaggerated Conv-TasNet-based speech enhancement based on a speech feature of a noisy signal and a signal obtained by a Conv-TasNet-based speech enhancement and a trained additional DNN.

The error estimation unit 140 may estimate a target-exaggerated residual error of a speech signal obtained by speech enhancement. The error estimation unit 140 may estimate a target-exaggerated residual error of a speech signal obtained by deep learning-based speech enhancement.

If target exaggeration-based speech enhancement with an additional DNN in the time-frequency domain approach method is performed, the error estimation unit 140 may perform target-exaggerated residual error estimation based on the results of the feature extraction of a received noisy signal and a signal obtained by a DNN-based speech enhancement, and a trained additional DNN for target-exaggerated residual error estimation.

If speech enhancement to which a target exaggeration with an additional DNN in the time domain approach method has been applied is performed, the error estimation unit 140 may perform target-exaggerated residual error estimation based on the results of the feature extraction of a received noisy signal and a signal obtained by a Conv-TasNet-based speech enhancement, and a trained additional DNN for target-exaggerated residual error estimation.

The speech restoration unit 150 may restore a speech based on an enhanced speech signal and an estimated target-exaggerated residual error.

If target exaggeration-based speech enhancement in the cost function in the time-frequency domain approach method is performed, the speech restoration unit 150 may restore a speech based on the results of the feature extraction of a received noisy signal and a target-exaggerated speech signal obtained by a trained target-exaggerated DNN.

If speech enhancement to which a target exaggeration with an additional DNN in the time-frequency domain approach method has been applied is performed, the speech restoration unit 150 may restore a speech based on the results of the feature extraction of a received noisy signal and a signal obtained by a DNN-based speech enhancement and the estimated target-exaggerated residual error obtained by a trained additional DNN for target-exaggerated residual error estimation.

If speech enhancement to which a target exaggeration with an additional DNN in the time domain approach method has been applied is performed, the speech restoration unit 150 may restore a speech based on the results of the feature extraction of a signal obtained by a Conv-TasNet-based speech enhancement and a target-exaggerated residual error obtained by a trained additional DNN for target-exaggerated residual error estimation.

FIGS. 2 and 3 are diagrams for describing a target exaggeration method in a cost function of deep learning-based speech enhancement and a target exaggeration method with an additional DNN according to an embodiment of the present disclosure.

FIG. 2 is a diagram for describing the time-frequency domain approach method in the target exaggeration method in the cost function of deep learning-based speech enhancement and the target exaggeration method with an additional DNN.

Referring to FIG. 2, speech enhancement to which the target exaggeration in the cost function of DNN-based speech enhancement and the target exaggeration with an additional DNN in the time-frequency domain approach method have been applied may include performing a training stage and an enhancement stage.

The training stage for speech enhancement to which a target exaggeration in the cost function of DNN-based speech enhancement in the time-frequency domain approach method has been applied may include a step S111 of receiving a clean signal and a noisy signal, a step S112 of extracting a speech feature of the clean signal and the noisy signal, and a step S113 of performing DNN training by using a target-exaggerated cost function based on the extracted speech feature.

The enhancement stage for speech enhancement to which a target exaggeration in the cost function of DNN-based speech enhancement in the time-frequency domain approach method has been applied may include a step S121 of receiving a noisy signal, a step S122 of extracting a feature of the received noisy signal, a step S123 of performing target-exaggerated DNN-based speech enhancement based on the extracted feature of the noisy signal and a trained DNN, and a step S125 of restoring a speech based on a signal obtained by a target-exaggerated DNN-based speech enhancement.

The training stage for speech enhancement to which a target exaggeration with an additional DNN in the time-frequency domain approach method has been applied may include a step S111 of receiving a clean signal and a noisy signal, a step S112 of extracting a speech feature of the clean signal and the noisy signal, a step S113 of performing DNN training by using a MSE cost function based on the extracted speech feature, a step S114 of performing DNN-based speech enhancement based on the trained DNN or a step S115 of performing DNN training for target-exaggerated residual error estimation based on the speech features of a clean signal, a noisy signal and a signal obtained by a DNN-based speech enhancement.

The enhancement stage for speech enhancement to which a target exaggeration with an additional DNN in the time-frequency domain approach method has been applied may include a step S121 of receiving a noisy signal, a step S122 of extracting a feature of the received noisy signal, a step S123 of performing DNN-based speech enhancement based on the extracted feature of the noisy signal and a trained DNN, a step S124 of performing DNN-based residual error estimation based on the results of the feature extraction of the received noisy signal and the signal obtained by a DNN-based speech enhancement and a trained additional DNN for target-exaggerated residual error estimation or a step S125 of restoring a speech based on the results of the feature extraction of the received noisy signal, the signal obtained by a DNN-based speech enhancement and the estimated target-exaggerated residual error obtained by a trained additional DNN.

FIG. 3 is a diagram for describing the time domain approach method in the target exaggeration with an additional DNN for deep learning-based speech enhancement.

Referring to FIG. 3, speech enhancement to which the target exaggeration with an additional DNN in the time domain approach method has been applied may include performing a training stage and an enhancement stage.

The training stage for speech enhancement to which a target exaggeration with an additional DNN in the time domain approach method has been applied may include a step S211 of receiving a clean signal and a noisy signal, a step S212 of performing Conv-TasNet training by using a SI-SNR cost function based on the clean signal and the noisy signal, a step S213 of performing Conv-TasNet-based speech enhancement on the noisy signal based on the a trained Conv-TasNet, a step S214 of extracting a feature of a signal obtained by a Conv-TasNet-based speech enhancement, a step S215 of extracting a feature of the clean signal and the noisy signal or a step S216 of performing DNN training for target-exaggerated residual error estimation based on a speech feature extracted from the clean signal, the noisy signal and the signal obtained by the Cony-TasNet-based speech enhancement.

The enhancement stage for speech enhancement to which a target exaggeration with an additional DNN in the time domain approach method has been applied may include a step S221 of receiving a noisy signal, a step S222 of performing Conv-TasNet-based speech enhancement based on the noisy signal and the a trained Conv-TasNet, a step S223 of extracting a feature of the received noisy signal, a step S224 of extracting a feature of the signal obtained by the Conv-TasNet-based speech enhancement, a step S225 of performing target-exaggerated residual error estimation based on the results of the feature extraction of the received noisy signal and the signal obtained by the Conv-TasNet speech enhancement, and the trained target-exaggerated residual error estimation DNN or a step S226 of restoring a speech based on the results of the feature extraction of the signal obtained by the Conv-TasNet-based speech enhancement and an estimated target-exaggerated residual error obtained by a trained additional DNN.

FIGS. 4 to 8 are diagrams for describing the target exaggeration method according to an embodiment of the present disclosure.

Referring to FIGS. 4 to 8, a deep learning model used for speech enhancement in the time-frequency domain approach method may include a feed-forward deep neural network (FFDNN) and a long-short term memory (LSTM).

A deep learning model used for speech enhancement in the time-frequency domain approach method may include an input layer, an output layer, and a hidden layer.

The input layer may have 903-dimensions as a noisy LPS feature for 7 neighbor frames. The output layer may have 129-dimensions as an LPS feature for a current frame. The hidden layer may include 3 layers with 2048-units for an FFDNN and 2 layers with 1024-units for a LSTM.

The deep learning model used for speech enhancement in the time domain approach method may include Conv-TasNet.

According to an embodiment, a deep learning model used for a target exaggeration with an additional DNN may include an FFDNN. The deep learning model used in the target exaggeration method may include an input layer, an output layer, and a hidden layer. The input layer may have 1032-dimensions with seven frames of the speech enhancement DNN outputs and the current frame of the noisy LPS feature. The output layer may have 129-dimensions as a residual error estimate of a speech enhancement DNN output for a current frame. The hidden layer may include 3 layers with 512-units.

A data set of a target exaggeration method for speech enhancement may include a training set, a validation set, and a test set.

The training set may include a speech data, noise data, and signal-to-noise ratio (SNR) level. The speech data may include 4620 utterances from a training set of a TIMIT database. The noise data may include four types of noise, such as babbles, restaurant, street, and white noise. The SNR level may include −5 dB, 0 dB, 5 dB, 10 dB, 15 dB, and 20 dB.

The validation set may include a speech data, noise data, and SNR level, and speech data may include 200 utterances randomly selected from a core test set of the TIMIT database. The noise data may include two types of noise, such as destroyer ops and F16 noises. The SNR level may include −5 dB, 0 dB, 5 dB, 10 dB, 15 dB, and 20 dB.

The test set may include a speech data, noise data, and SNR level. The speech data may include 200 utterances randomly selected from a test set of the TIMIT database. The noise data may include five types of noise, such as Buccaneer1, destroyer engine, Factory1, car, and exhibition noise. The SNR level may include −5 dB, 0 dB, 5 dB, 10 dB, 15 dB, and 20 dB.

Furthermore, evaluation according to speech enhancement may be determined based on perceptually evaluation of speech quality (PESQ) and short-time objective intelligibility (STOI).

FIG. 4 shows the performance of the FFDNN-based speech enhancement to which a target exaggeration in a cost function in the time-frequency domain approach has been applied depending on the target exaggeration factor.

FIG. 5 shows the performance of the FFDNN-based speech enhancement to which a target exaggeration with an additional DNN in the time-frequency domain approach has been applied depending on the target exaggeration factor. In this case, it may be seen that the highest performance is obtained in D=3 with respect to each of the target exaggeration method in the cost function and the target exaggeration method with an additional DNN.

FIG. 6 shows the performance of the FFDNN-based speech enhancement to which a target exaggeration in the cost function and a target exaggeration with an additional DNN in the time-frequency domain approach have been applied for a test set. It may be seen that the highest performance is obtained in D=3 and D=2 in a target exaggeration with an additional DNN with respect to a target exaggeration applied to a LSTM and a Conv-TasNet, respectively.

FIG. 7 shows the performance when conventional technologies (e.g., GVE post-processing, GVE post-training, and POS-DAE) and a target exaggeration method with an additional DNN, that is, the target exaggeration technology of the present disclosure are applied to the FFDNN-based speech enhancement for a test set. Accordingly, it may be seen that the target exaggeration with an additional DNN has the highest performance compared to the conventional technologies.

FIG. 8 shows the performance of a target exaggeration method applied to various deep learning-based speech enhancement schemes. The target exaggeration method was used in an FFDNN and a LSTM that are the time-frequency domain approach method, and Conv-TasNet that is the time domain approach method. It may be seen that performance is enhanced if the target exaggeration method with an additional DNN, that is, the target exaggeration technology, is applied.

FIG. 9 is a diagram illustrating performance of a target exaggeration method applied to deep learning-based speech enhancement schemes according to an embodiment of the present disclosure.

Referring to FIG. 9, it may be seen that when spectrograms of a clean speech, noisy speech, and signals obtained by an FFDNN and Conv-TasNet without and with the target exaggeration technology are compared, the target exaggeration technology makes the output of a deep learning model having an over-smoothing phenomenon close to a clean speech signal.

The aforementioned target exaggeration method for deep learning-based speech enhancement may be implemented as a computer-readable code on a computer-readable medium. The computer-readable recording medium may be a mobile recording medium (e.g., a CD, a DVD, a Blueray disk, a USB storage device, or a mobile hard disk) or may be a fixed recording medium (e.g., a ROM, a RAM, or a hard disk embedded in a computer), for example. A computer program recorded on the computer-readable recording medium may be transmitted to another computing device over a network, such as the Internet, and may be installed in the another computing device, so the computer program may be used in the another computing device.

Although all the elements constituting an embodiment of the present disclosure are illustrated to be combined into one or to be combined and operated, the present disclosure is not necessarily limited to the embodiment. That is, one or more of all the elements may be selectively combined and operated within the range of the present disclosure.

Although the operations have been illustrated in a specific order in the drawings, it should not be understood that desired results can be obtained only when the operations must be executed in the illustrated specific order or a sequential order or all the illustrated operations are executed. In a specific situation, multitasking and parallel processing may be advantageous. Furthermore, in the aforementioned embodiments, it should not be understood that the separation of various elements must be necessary, and it should be understood that the aforementioned program components and systems may be integrated into a single software product or may be packaged as multiple software products.

The present disclosure has been described so far based on the embodiments. A person having ordinary knowledge in the art to which the present disclosure pertains will understand that the present disclosure may be implemented in a modified form without departing from the intrinsic characteristics of the present disclosure. Accordingly, the disclosed embodiments should be considered from a descriptive viewpoint not a limitative viewpoint. The scope of the present disclosure are disclosed in the claims not the aforementioned description, and all differences within an equivalent range thereof should be construed as being included in the present disclosure.

DESCRIPTION OF REFERENCE NUMERALS

110: signal input unit 120: feature extraction unit
130: expansion unit 140: error estimation unit
150: speech restoration unit

What is claimed is:

1. An apparatus for a target exaggeration for deep learning-based speech enhancement, comprising:
   a signal input unit configured to receive a speech signal comprising a clean signal and a noisy signal;
   a feature extraction unit configured to extract a feature of the speech signal;
   an expansion unit configured to perform the deep learning-based speech enhancement and target exaggeration based on the extracted feature of the speech signal;
   an error estimation unit configured to estimate a target-exaggerated residual error of the speech signal obtained by the deep learning-based speech enhancement; and
   a speech restoration unit configured to restore a speech based on the enhanced speech signal and the estimated target-exaggerated residual error,
   wherein the apparatus for a target exaggeration for deep learning-based speech enhancement performs, as the target exaggeration for the deep learning-based speech enhancement, at least one target process of a target exaggeration in a cost function of DNN-based speech enhancement in the time-frequency domain approach method, and a target exaggeration with an additional DNN in the time-frequency domain approach method, and a target exaggeration method with an additional DNN in the time domain approach method,
   wherein if the target exaggeration with an additional DNN for the DNN-based speech enhancement in the time domain approach method is performed, the apparatus for a target exaggeration for deep learning-based speech enhancement performs training stage of speech enhancement to which the target exaggeration with an additional DNN in the time domain approach method has been applied and enhancement stage of the speech enhancement to which the target exaggeration with an additional DNN in the time domain approach method has been applied,
   wherein if the training stage of the speech enhancement to which the target exaggeration with an additional DNN in the time domain approach method is performed,
   the signal input unit receives the clean signal and the noisy signal,
   the expansion unit performs Conv-TasNet (Convolutional Time-Domain Audio Separation Network) training on the clean signal and the noisy signal by using the SI-SNR (Scale-Invariant Signal-To-Noise Ratio) cost function and performs Conv-TasNet-based speech enhancement by using the noisy signal based on the Conv-TasNet,
   the feature extraction unit extracts a speech feature of the clean signal, the noisy signal, and the signal obtained by a Conv-TasNet-based speech enhancement, and
   the expansion unit performs DNN training for target-exaggerated residual error estimation based on a speech feature extracted from the clean signal, the noisy signal, and the signal obtained by a Conv-TasNet-based speech enhancement.

2. The apparatus of claim 1, wherein if the target exaggeration in the cost function of DNN-based speech enhancement in the time-frequency domain and the target exaggeration with an additional DNN in the time-frequency domain are performed, the apparatus for a target exaggeration for deep learning-based speech enhancement performs training stage of speech enhancement to which the target exaggeration in the cost function in the time-frequency domain approach method has been applied and enhancement stage of the speech enhancement to which the target exaggeration in the cost function in the time-frequency domain approach method has been applied.

3. The apparatus of claim 2, wherein if the training stage of the speech enhancement to which the target exaggeration in the cost function in the time-frequency domain approach method is performed,
   the signal input unit receives the clean signal and the noisy signal,
   the feature extraction unit extracts a speech feature of the clean signal and the noisy signal, and
   the expansion unit performs DNN training by using a target-exaggerated cost function based on the extracted speech feature.

4. The apparatus of claim 3, wherein if the enhancement stage of the speech enhancement to which the target exaggeration in the cost function in the time-frequency domain approach method is performed,
   the signal input unit receives the noisy signal,
   the feature extraction unit extracts a feature of the received noisy signal,
   the expansion unit performs target-exaggerated DNN-based speech enhancement based on the extracted feature of the noisy signal and the trained DNN, and
   the speech is restored based on a speech feature of a noisy signal and a signal obtained by target-exaggerated speech enhancement.

5. The apparatus of claim 2, wherein if the training stage of the speech enhancement to which the target exaggeration with an additional DNN in the time-frequency domain approach method is performed, the signal input unit receives the clean signal and the noisy signal, the feature extraction unit extracts a speech feature of the clean signal and the noisy signal, the expansion unit performs DNN training on the extracted speech feature by using a MSE (Mean-Square Error) cost function and performs DNN-based speech enhancement based on the trained DNN, and DNN training of target-exaggerated residual error estimation is performed based on the speech feature extracted in the clean signal, the noisy signal and the signal obtained by a DNN-based speech enhancement.

6. The apparatus of claim 5, wherein if the enhancement stage of the speech enhancement to which the target exaggeration with an additional DNN in the time-frequency domain approach method is performed, the signal input unit receives the noisy signal, the feature extraction unit extracts a feature of the received noisy signal, the expansion unit performs DNN-based speech enhancement based on the extracted feature of the noisy signal and the trained DNN, the error estimation unit performs target-exaggerated residual error estimation based on results of the feature extraction of the received noisy signal, the signal obtained by a DNN-based speech enhancement and the trained additional DNN for target-exaggerated residual error estimation, and the speech restoration unit restores the speech based on the results of the feature extraction of the received noisy signal, the signal obtained by a DNN-based speech enhancement and an estimated target-exaggerated residual error obtained by a trained additional DNN.

7. The apparatus of claim 1, wherein if the enhancement stage of the speech enhancement to which the target exaggeration with an additional DNN in the time domain approach method is performed, the signal input unit receives the noisy signal, the expansion unit performs Conv-TasNet-based speech enhancement based on the noisy signal and the trained Conv-TasNet, the feature extraction unit extracts a feature of the received noisy signal and the signal obtained by the Conv-TasNet-based speech enhancement, the error estimation unit performs target-exaggerated residual error estimation based on results of the feature extraction of the received noisy signal and the signal obtained by a Conv-Tasnet-based speech enhancement, and the trained additional DNN for target-exaggerated residual error estimation, and the speech restoration unit restores the speech based on the results of the feature extraction of the signal obtained by the Conv-TasNet-based speech enhancement, and an estimated target-exaggerated residual error obtained by a trained additional DNN.

8. A method for a target exaggeration for deep learning-based speech enhancement, comprising steps of:

receiving a speech signal comprising a clean signal and a noisy signal;

extracting a feature of the speech signal;

performing the deep learning-based speech enhancement and target exaggeration based on the extracted feature of the speech signal;

estimating a target-exaggerated residual error of the speech signal obtained by the deep learning-based speech enhancement; and restoring a speech based on the enhanced speech signal and the estimated target-exaggerated residual error, wherein the step of performing the deep learning-based speech enhancement and target exaggeration based on the extracted feature of the speech signal comprises steps of:

performing a target exaggeration in a cost function of DNN-based speech enhancement in a time-frequency domain approach method and a target exaggeration with an additional DNN in a time-frequency domain approach method; and performing a target exaggeration with an additional DNN in a time domain approach method, wherein the step of performing a target exaggeration with an additional DNN in a time domain approach method comprises steps of:

performing training stage of speech enhancement to which the target exaggeration with an additional DNN in the time domain approach method has been applied; and performing enhancement stage of the speech enhancement to which the target exaggeration with an additional DNN in the time domain approach method has been applied, wherein the step of performing training stage of speech enhancement to which the target exaggeration with an additional DNN in the time domain approach method has been applied comprises steps of:

receiving the clean signal and the noisy signal;

performing Conv-TasNet (Convolutional Time-Domain Audio Separation Network) training on the clean signal and the noisy signal by using the SI-SNR (Scale-Invariant Signal-To-Noise Ratio) cost function;

performing Conv-TasNet-based speech enhancement by using the noisy signal based on the trained Conv-TasNet;

extracting a feature of the clean signal, the noisy signal and the signal obtained by a Conv-TasNet-based speech enhancement; and performing DNN training for target-exaggerated residual error estimation based on a speech feature extracted from the clean signal, the noisy signal and the signal obtained by the Conv-TasNet-based speech enhancement.

9. The method of claim 8, wherein the step of performing a target exaggeration in a cost function of DNN-based speech enhancement in a time-frequency domain approach method and a target exaggeration with an additional DNN in a time-frequency domain approach method comprises steps of:

performing training stage of speech enhancement to which the target exaggeration in the cost function in the time-frequency domain approach method has been applied; and performing enhancement stage of the speech enhancement to which the target exaggeration in the cost function in the time-frequency domain approach method has been applied.

10. The method of claim 9, wherein the step of performing training stage of speech enhancement to which the target exaggeration in the cost function in the time-frequency domain approach method has been applied comprises steps of:

receiving the clean signal and the noisy signal;

extracting a speech feature of the clean signal and the noisy signal; and performing DNN training by using a target-exaggerated cost function based on the extracted speech feature.

11. The method of claim 10, wherein the step of performing enhancement stage of the speech enhancement to which the target exaggeration in the cost function in the time-frequency domain approach method has been applied comprises steps of:
   receiving the noisy signal;
   extracting a feature of the received noisy signal;
   performing target-exaggerated DNN-based speech enhancement based on the extracted feature of the noisy signal and the trained DNN; and
   restoring the speech based on the signal obtained by a target-exaggerated speech enhancement based on the trained DNN.

12. The method of claim 8, wherein the step of performing training stage of speech enhancement to which the target exaggeration with an additional DNN in the time-frequency domain approach method has been applied comprises steps of:
   receiving the clean signal and the noisy signal;
   extracting a speech feature of the clean signal and the noisy signal;
   performing DNN training on the extracted speech feature by using a MSE (Mean-Square Error) cost function;
   performing DNN-based speech enhancement based on the trained DNN; and
   performing DNN training for target-exaggerated residual error estimation based on the extracted speech feature of the clean signal, the noisy signal and the signal obtained by a DNN-based speech enhancement.

13. The method of claim 12, wherein the step of performing enhancement stage of the speech enhancement to which the target exaggeration with an additional DNN in the time-frequency domain approach method has been applied comprises steps of:
   receiving the noisy signal;
   extracting a feature of the received noisy signal;
   performing DNN-based speech enhancement based on the extracted feature of the noisy signal and the trained DNN;
   performing target-exaggerated residual error estimation based on results of the feature extraction of the received noisy signal, the signal obtained by DNN-based speech enhancement and the trained additional DNN for target-exaggerated residual error estimation; and
   restoring the speech based on the results of the feature extraction of the received noisy signal and the signal obtained by the DNN-based speech enhancement and an estimated target-exaggerated residual error obtained by the trained additional DNN.

14. The method of claim 8, wherein the step of performing enhancement stage of the speech enhancement to which the target exaggeration with an additional DNN in the time domain approach method has been applied comprises steps of:
   receiving the noisy signal;
   performing Conv-TasNet-based speech enhancement based on the noisy signal and the trained Conv-TasNet;
   extracting a feature of the received noisy signal and the signal obtained by the Conv-TasNet-based speech enhancement;
   performing target-exaggerated residual error estimation based on results of the feature extraction of the received noisy signal and the signal obtained by the Conv-TasNet-based speech enhancement, and the trained additional DNN for target-exaggerated residual error estimation; and
   restoring the speech based on the results of the feature extraction of the signal obtained by the Conv-TasNet-based speech enhancement and the estimated target-exaggerated residual error obtained by the trained additional DNN.

* * * * *